(12) United States Patent
Engi et al.

(10) Patent No.: US 12,718,835 B2
(45) Date of Patent: Aug. 25, 2026

(54) CERTIFYING ROOM PRIVACY LEVELS AND USER STEERING BASED ON PRIVACY REQUIREMENTS

(71) Applicant: Cisco Technology, Inc., San Jose, CA (US)

(72) Inventors: Derek Engi, Pleasant Ridge, MI (US); Matthew David Barber, London (GB); Matthew Robert Engle, Plano, TX (US); Joseph Michael Clarke, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 160 days.

(21) Appl. No.: 18/640,109

(22) Filed: Apr. 19, 2024

(65) Prior Publication Data

US 2025/0329341 A1 Oct. 23, 2025

(51) Int. Cl.
*G10L 15/26* (2006.01)
*G10L 17/00* (2013.01)
*G10L 25/48* (2013.01)

(52) U.S. Cl.
CPC .............. *G10L 25/48* (2013.01); *G10L 15/26* (2013.01); *G10L 17/00* (2013.01)

(58) Field of Classification Search
None
See application file for complete search history.

(56) References Cited

U.S. PATENT DOCUMENTS

2017/0213440 A1* 7/2017 O'Larte ................. G08B 23/00
2019/0147902 A1* 5/2019 Santos ..................... H04K 3/82 704/200
2020/0065514 A1 2/2020 Keen et al.
2020/0342983 A1* 10/2020 Ogawa ................... G08B 25/04
2021/0182111 A1* 6/2021 Jakobsson ............. G06F 9/5055
2022/0138634 A1* 5/2022 Covell ................... G06N 20/00 705/5

(Continued)

FOREIGN PATENT DOCUMENTS

CN 116559287 A 8/2023
JP 2021124659 A 8/2021

OTHER PUBLICATIONS

Deskflex, "Online Scheduling with DeskFlex," Office Hoteling Software, Desk Booking Software, Hot Desking Software's, retrived from https://www.deskflex.com on Apr. 19, 2024, 14 pages.

*Primary Examiner* — Neeraj Sharma
(74) *Attorney, Agent, or Firm* — Edell, Shapiro & Finnan, LLC

(57) ABSTRACT

A method, computer system, and computer program product are provided for assessing workspaces for privacy and allocating users to workspaces. Audio is obtained from one or more rooms of a building, wherein the audio is obtained via one or more microphones that are positioned outside of each of the one or more rooms. The audio is analyzed to determine a privacy level for each of the one or more rooms. A user is identified who is present in the building, wherein an identity of the user indicates privacy requirements of the user. The user is assigned to a particular room of the one or more rooms based on the privacy requirements of the user and the privacy level of each of the one or more rooms.

20 Claims, 14 Drawing Sheets

(56) References Cited

U.S. PATENT DOCUMENTS

| | | | | |
|---|---|---|---|---|
| 2023/0184582 | A1 | 6/2023 | Otsuka | |
| 2023/0352026 | A1* | 11/2023 | Springer | G10L 15/193 |
| 2024/0005277 | A1* | 1/2024 | Demmer | G06Q 10/103 |
| 2024/0048400 | A1 | 2/2024 | Iwase | |
| 2024/0087234 | A1* | 3/2024 | Monti | A63F 13/79 |
| 2024/0094880 | A1* | 3/2024 | Comer | G06F 3/04842 |
| 2024/0137235 | A1* | 4/2024 | Allen | H04L 12/1818 |
| 2025/0111845 | A1* | 4/2025 | Thiruchengode Vajravel | G06F 21/6218 |

* cited by examiner

CERTIFYING ROOM PRIVACY LEVELS AND USER STEERING BASED ON PRIVACY REQUIREMENTS

TECHNICAL FIELD

The present disclosure relates generally to electronic communication security and eavesdropping prevention techniques.

BACKGROUND

In "hoteling" and "hot desk" arrangements, individuals are allocated workspaces according to occupancy or resource allocation preferences. However, a critical concern arises regarding the confidentiality of tasks conducted within these spaces and the overall physical security of the environment. Often, the protocols governing these setups fail to adequately safeguard sensitive information that can be overheard in these shared spaces. For example, an individual may be assigned to a room in which the individual's speech can be overheard, making it possible for unauthorized parties to eavesdrop.

DETAILED DESCRIPTION

Overview

Figure 1:
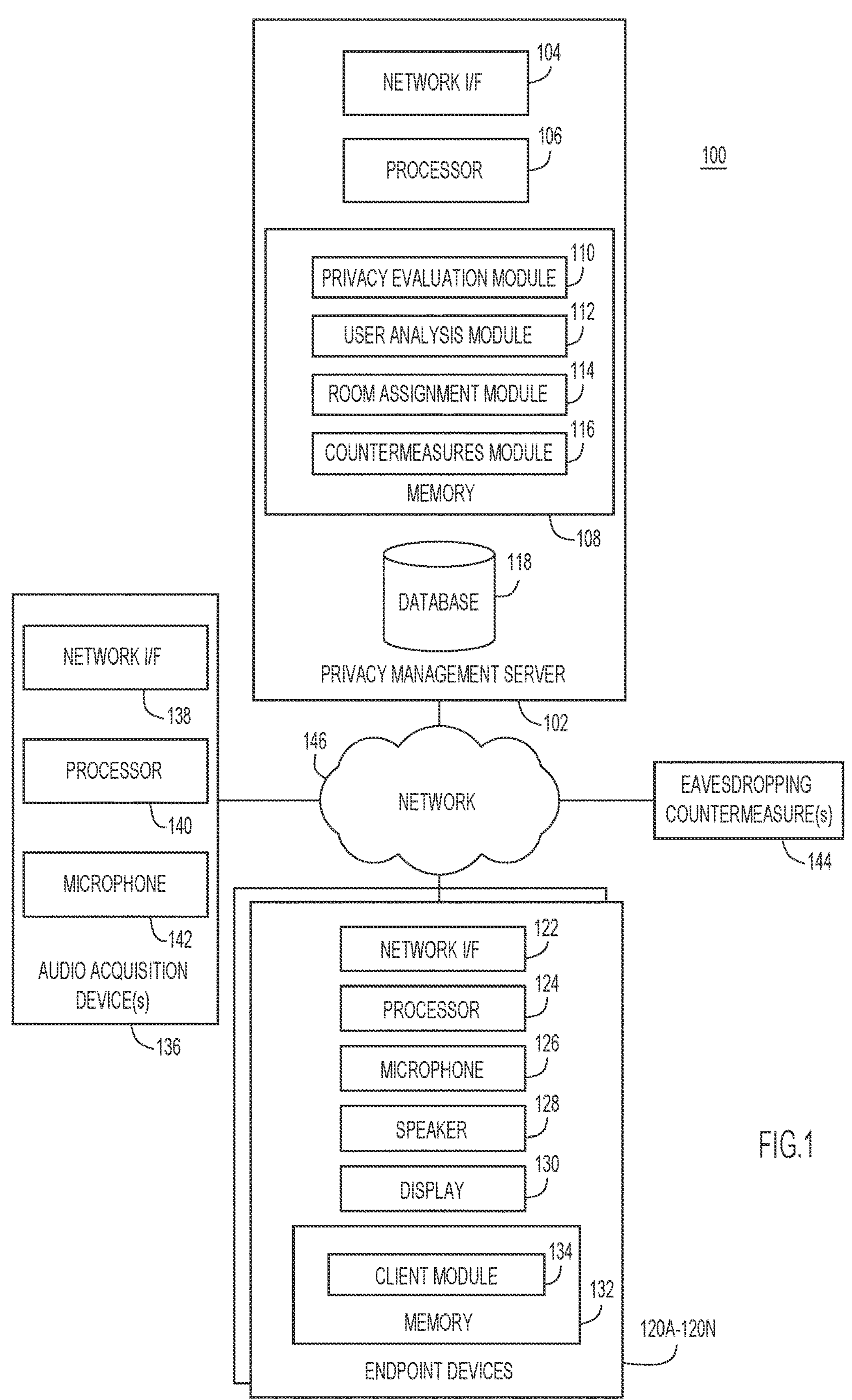
FIG. 1 is a block diagram depicting a network environment for assessing workspaces for privacy and allocating users to workspaces, according to an example embodiment.

According to one embodiment, techniques are provided for assessing workspaces for privacy and allocating users to workspaces. Audio is obtained from one or more rooms of a building, wherein the audio is obtained via one or more microphones that are positioned outside of each of the one or more rooms. The audio is analyzed to determine a privacy level for each of the one or more rooms. A user is identified who is present in the building, wherein an identity of the user indicates privacy requirements of the user. The user is assigned to a particular room of the one or more rooms based on the privacy requirements of the user and the privacy level of each of the one or more rooms.

EXAMPLE EMBODIMENTS

Present embodiments relate to electronic communication security and eavesdropping prevention techniques. In a setting that involves a shared space, such as an office, it can be difficult to discuss confidential or other sensitive subject matter without the possibility of being overheard by undesired parties. For example, when an individual joins a video conference session from an office's conference room, other inhabitants of the office may be able to hear the individual speaking, even when the doors to the conference room are closed. This problem is exacerbated in the case on hoteling or hot desk environments in workspaces are not assigned to specific individuals but instead are assigned in a first-come, first-serve manner or according to a particular assignment protocol. Since different individuals may have different privacy requirements due to the nature of their work, hoteling or hot desk environments make it difficult to guarantee users' privacy, especially in terms of eavesdropping prevention.

To address this problem, the embodiments presented herein provide an improved approach to detecting and remediating any potential eavesdropping activities. Techniques are described herein for certifying the confidentiality of workspaces based on the potential for a conversation to be overheard in adjacent areas. Moreover, workspaces can be assessed for a confidentiality or privacy level based on the requirements of particular users. For example, certain users may tend to discuss more confidential matters, and accordingly should be provided with workspaces that fit their privacy requirements. In particular, audio can be captured outside of a room and analyzed to assess the room for privacy based on the likelihood that others can overheard a user who is speaking in that room.

Thus, present embodiments improve the technical field of data security by certifying rooms for privacy based on analysis that identifies the degree of audio bleed-through into adjoining spaces as well as the specific privacy requirements of individuals. Moreover, machine learning techniques can be employed in which the intelligibility of any overheard speech is quantifiably measured, thereby preventing users from being assigned to rooms that do not support their privacy requirements. Thus, present embodiments provide the practical application of improving data security by preventing unauthorized individuals from overhearing any conversations or other audio for which protection is desired.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

With reference now to FIG. 1, a block diagram is presented depicting a network environment 100 for assessing workspaces for privacy and allocating users to workspaces, according to an example embodiment. As depicted, network environment 100 includes a privacy management server 102, a plurality of endpoint devices 120A-120N, one or more audio acquisition devices 136, and one or more eavesdropping countermeasures 144 that are in communication via a network 146. It is to be understood that the functional division among components have been chosen for purposes of explaining various embodiments and is not to be construed as a limiting example.

Privacy management server 102 includes a network interface (I/F) 104, at least one processor (computer processor) 106, memory 108 (which stores instructions for a privacy evaluation module 110, a user analysis module 112, a room assignment module 114, and a countermeasures module 116), and a database 118. In various embodiments, privacy management server 102 may include a rack-mounted server, laptop, desktop, smartphone, tablet, or any other programmable electronic device capable of executing computer readable program instructions. Network interface 104 may be a network interface card that enables components of privacy management server 102 to send and receive data over a network, such as network 146. Privacy management server 102 may be configured to analyze audio obtained from audio acquisition devices 136 in order to identify whether users in an environment can overhear other users. Additionally, privacy management server 102 may analyze the privacy requirements of users in order to assign users to particular workspaces that satisfy the users' privacy requirements.

Privacy evaluation module 110, user analysis module 112, room assignment module 114, and countermeasures module 116 may include one or more modules or units to perform various functions of the embodiments described below. Privacy evaluation module 110, user analysis module 112, room assignment module 114, and countermeasures module 116 may be implemented by any combination of any quantity of software and/or hardware modules or units, and may reside within memory 108 of privacy management server 102 for execution by a processor, such as processor 106.

Privacy evaluation module 110 may assess the privacy of rooms in a setting such as an office or other structure in which users may desire to discuss confidential or sensitive subject matter. As used herein, the term "room" should be construed as applying to any setting in which a user may conduct meetings, either in-person or via an endpoint device (phone, webcam, etc.), and can include workspaces such as open office workspace settings, cubicles, rooms with or without doors, and the like.

In some embodiments, privacy evaluation module 110 analyzes audio that is captured by one or more microphones (e.g., microphone 126 of any endpoint device 120A-120N and/or microphone 142 of audio acquisition device(s) 136) in order to determine whether a user's speech can be overheard. Privacy evaluation module 110 can analyze audio that is obtained from any location that a potential location for eavesdropping in a facility. For example, if a user is talking inside of a room and there is a concern for that user being overheard, audio can be obtained from outside of that room at a location such as an adjacent desk or other workspace. The audio can be obtained using a microphone that is positioned in an ad hoc manner for the purpose of testing how readily a user can be overheard, or the audio can be obtained by a microphone that is integrated into a device (e.g., a preexisting device in the facility), such as a workstation or meeting endpoint. For example, if there are two adjacent rooms, source audio from a first room can be obtained from a microphone in the second room to determine whether a user's speech can be overheard. Audio can be obtained from outside of a room in order to determine whether a user who is speaking in the room can be overheard outside of the room, and/or audio can be obtained from inside of a room in order to determine whether the room is occupied.

The audio that is obtained by privacy evaluation module 110 can be provided in a variety of manners according to various embodiments. In some embodiments, a user may provide a speech sample either for the purpose of testing the privacy level of a workspace, or during the course of a meeting. In some embodiments, privacy levels of rooms or other workspaces can be specifically assessed for each user, as different individuals may have different speaking volumes and/or pitches that can affect the ability to which those individuals can be overheard. In other embodiments, a prerecorded sample of speech or other sounds (e.g., white noise) can be played at a speaker, and a microphone may collect the audio for analysis by privacy evaluation module 110.

Privacy evaluation module 110 analyzes audio to determine a volume of the audio, which can be correlated to the degree to which a user can be overheard. Since a microphone obtains audio at a particular distance from the source, there may be some sound attenuation. Additionally, sound attenuation can be impacted by whether certain doors in a facility are open or closed, or if other impediments are placed in certain positions. Thus, a workspace can be certified for privacy based on any particular circumstances that can be selected based on a desired use case (e.g., any situation in which a user is speaking and desires privacy). In some embodiments, privacy evaluation module 110 identifies the volume of audio that is obtained via a microphone and compares the volume to a threshold volume level to certify a room as either private (i.e., secure for discussing confidential matters) or not private. In other embodiments, various privacy levels can be defined according to ranges of volumes, and if the obtained audio falls within a particular volume range, a room can be classified at a corresponding privacy level (e.g., low privacy, medium privacy, high privacy). The privacy levels can indicate a degree to which a room is secure for conducting confidential discussions. For example, a "low" privacy level may indicate that a room is not secure, a "medium" privacy level may indicate that a room is likely to be secure but other precautions should be taken (such as activating a white noise generator outside of the room or shutting one or more doors), and a "high" privacy level can indicate that a room is generally secure for confidential conversations. The volume level that is compared to the one or more predefined threshold volume levels can be a highest volume level that is obtained over a span of time, or statistical analysis can be performed to compute an average volume level over a span of time that is used for comparison. The average volume level that is used in such comparisons can be a mathematical mean, median, a particular percentile (e.g., an upper quartile in terms of loudness), etc.

In some embodiments, privacy evaluation module 110 employs a speech-to-text model that is used to certify the privacy level of a room or other workspace. An audio sample can be provided, at the workspace being certified, that includes a known sample of words. In various embodiments, a user can read aloud from a text script, or a prerecorded sample of human speech can be played via a speaker. The audio can be obtained by a microphone and provided to a speech-to-text model that is configured to convert input speech audio into a text transcript. The speech-to-text model can be a machine learning model that is trained using a training set of examples of audio speech and corresponding text; in some embodiments, the speech-to-text model may specifically be trained using examples of audio speech that is muffled (e.g., obtained through a wall or door, etc.). The output of the model may include a text transcript of the audio, which can be compared to the known words in the audio that was spoken or played back to identify how many words are correctly identified by a model. As the audio may be attenuated, the speech-to-text model may not correctly identify some or all of the words. Thus, privacy evaluation module 110 can quantitatively certify the privacy level of a room based on the number of words that are correctly identified by the speech-to-text model. In some embodiments, a percentage or number of correctly-identified words can be compared to a threshold value to assess a room or workspace for privacy. Thus, a confidentiality score can be determined for a room. The room or workspace can be scored using a binary classification (e.g., "private" vs. "not private"), or a number of privacy levels can be defined based on the number or percentage of correctly-identified words.

User analysis module 112 may analyze user data so that rooms or other workspaces can be certified for privacy based on a user's privacy requirements. In various embodiments, the user data can include a label as to a user's privacy requirements (e.g., low, medium, or high), user calendar data, a user's role in an organization, and the like. In some embodiments, a user can be labeled with respect to the user's privacy requirements in a manner that is self-defined or defined by an organization. The user's label can be used for room assignments by assigning users whose labels indicate higher privacy requirements to more secure rooms. In some embodiments, users can be assigned to rooms having a privacy level that matches the user's privacy requirement label. Additionally or alternatively, users can be assigned preferentially to the most secure rooms based on the users' privacy requirement labels. For example, users having higher privacy requirement labels will be assigned to the most secure available workspaces preferentially over users having lower privacy requirement labels. Thus, the labels can indicate a room assignment priority. User analysis module 112 may analyze user calendar data to identify any meetings in which the user may discuss confidential or sensitive subject matter. In some embodiments, keyword matching can be employed to identify meetings that indicate that a user's privacy requirements are high. In some embodiments, a machine learning model, such as a large language model or other natural language processing model may analyze a user's calendar data to identify meetings in which confidential subject matter may be discussed based on the meeting title or agenda description. In some embodiments, a user's role in an organization can be used to determine a user's privacy requirements. For example, if a user is a manager or officer of an organization, the user may be determined to have higher privacy requirements than other users.

Additionally, user analysis module 112 may be configured to automatically identify users who are present at a location so that room assignments can be automatically determined in a manner that optimally assigns users having higher privacy requirements to rooms or other workspaces having higher privacy levels. In various embodiments, users can be identified using facial recognition technologies or based on identification cards (e.g., when a user swipes into a building or when a user's radio frequency identification (RFID) card is detected. Additionally or alternatively, users can be identified when those users log into an endpoint device using their credentials.

Room assignment module 114 may assign rooms to users based on the determined privacy levels of those rooms or based on the privacy levels of rooms in combination with the privacy requirements of users. Room assignment module 114 can be provided with data that includes room privacy levels, user privacy requirements, rooms that are occupied, and/or users who are present at a facility. Thus, room assignment module 114 can determine which rooms to allocate to which users by solving an optimization problem (e.g., according to Pareto optimization techniques) that prioritizes assigning users to available rooms that satisfy the users' privacy requirements. Room assignment module 114 can prioritize certain users over other users based on the privacy requirements of users. For example, if a first user has high privacy requirements, the first user may be assigned to a room where the first user might be able to overhear a second user having lower privacy requirements, but that second user cannot overhear the first user. In some embodiments, room assignment module 114 can reassign users to different rooms through a time period in order to optimize the privacy of users. Room assignment module 114 can dynamically assign or reassign rooms based on determined changes in privacy levels of rooms, based on changes in room occupancy, based on changes in users' privacy requirements (e.g., according to a user's calendar data), and any other changes over a given time span that impact privacy. In some embodiments, room assignment module 114 can enhance the privacy of certain rooms by employing countermeasures such as activating white noise generators, closing automatically-actuated doors, and the like. In some embodiments, room assignment module 114 can unassign users from rooms in order to prioritize other users and/or to increase the privacy levels of adjacent rooms.

Countermeasures module 116 may transmit instructions to active countermeasures that are configured to enhance the privacy of rooms and/or to alert users that their speech may be overheard by others. In some embodiments, countermeasures module 116 may activate a noise generator, such as a white noise generator or pink noise generator, that is positioned in proximity to a room for which a higher privacy level is desired. In some embodiments, countermeasures module 116 may activate a visual alert, such as a sign that illuminates (or other warning light), to indicate to a user that the user may be overheard by others. In other embodiments, countermeasures module 116 can cause a notification to be presented on a display of a user device (e.g., any of endpoint devices 120A-120N) to notify a user that the user can be overheard.

Database 118 may include any non-volatile storage media known in the art. For example, database 118 can be implemented with a tape library, optical library, one or more independent hard disk drives, or multiple hard disk drives in a redundant array of independent disks (RAID). Similarly, data in database 118 may conform to any suitable storage architecture known in the art, such as a file, a relational database, an object-oriented database, and/or one or more tables. Database 118 may store data including user data (e.g., user privacy requirements data, user calendar data, etc.), room occupancy data, and the like, which can be utilized by the modules in memory 108 in accordance with the embodiments presented herein.

Endpoint devices 120A-120N may each include a network interface (I/F) 122, at least one processor (computer processor) 124, a microphone 126, a speaker 128, a display 130, and memory 132 (which stores instructions for a client module 134). In various embodiments, endpoint devices 120A-120N may each include a rack-mounted server, laptop, desktop, smartphone, tablet, meeting room equipment, or any other programmable electronic device capable of executing computer readable program instructions. Network interface 122 enables components of each endpoint device 120A-120N to send and receive data over a network, such as network 146. Microphone 126 may include any transducer for converting sound to signals, and speaker 128 may include any transducer for converting signals to sound. Endpoint devices 120A-120N may each enable users to participate in conference sessions in which multimedia data is transmitted (e.g., video presentations) via microphone 126 for capturing speech of a user. Speaker 128 can play back audio of other meeting participants to a user, and any data can be presented via display 130, including multimedia data, video feeds of other users, and the like. Endpoint devices 120A-120N may be associated with particular rooms or may be mobile devices that are associated with particular users.

Client module 134 may include one or more modules or units to perform various functions of the embodiments described below. Client module 134 may be implemented by any combination of any quantity of software and/or hardware modules or units, and may reside within memory 132 of any of endpoint devices 120A-120N for execution by a processor, such as processor 124. Client module 134 may perform various operations to enable a user of each endpoint device 120A-120N to participate in communication sessions by exchanging multimedia data between endpoint devices 120A-120N, including video data and/or audio data. In some embodiments, client module 134 may present alerts to a user to indicate when the user may be overheard by another user.

Audio acquisition device(s) 136 may include a network interface (I/F) 138, at least one processor (computer processor) 140, and a microphone 142. Audio acquisition device(s) 136 can be positioned inside of an enclosed workspace, outside of an enclosed workspace, or near an open workspace in order to collect audio from the workspace. Audio acquisition device(s) 136 can be configured with signal processing algorithms to acquire, record, and transmit audio signals. Microphone 142 may include an omnidirectional or directional microphone that is positioned to capture audio emanating from a targeted area. Microphone 142 may obtain audio over a wide range of frequencies in order to assess the privacy level of a room. A sound card may be included in the audio acquisition device(s) 136 to convert captured audio to digital audio data that can be transmitted, by network I/F 138, over the network 146.

Eavesdropping countermeasure(s) 144 can include any electronic alert system to warn for the presence of potential eavesdroppers and/or to prevent eavesdropping. In some embodiments, eavesdropping countermeasure(s) 144 can include physical countermeasures, such as automated doors or other barriers that can be activated to provide additional barriers in a facility. Additionally or alternatively, eavesdropping countermeasure(s) 144 can include visual-based alerts (e.g., lights), haptic feedback (e.g., vibrations by a computing device (e.g., any of endpoint devices 120A-120N) or other device worn by a user such as a smartwatch), sound-based alerts (e.g., a siren or beep emitted by a speaker), and/or sound-based mitigation systems (e.g., white noise generators).

Network 146 may include a local area network (LAN), a wide area network (WAN) such as the Internet, or a combination of the two, and includes wired, wireless, or fiber optic connections. In general, network 146 can be any combination of connections and protocols known in the art that will support communications between privacy management server 102, endpoint devices 120A-120N, audio acquisition device(s) 136, and/or eavesdropping countermeasure(s) 144 via their respective network interfaces in accordance with the described embodiments.

Figure 2:
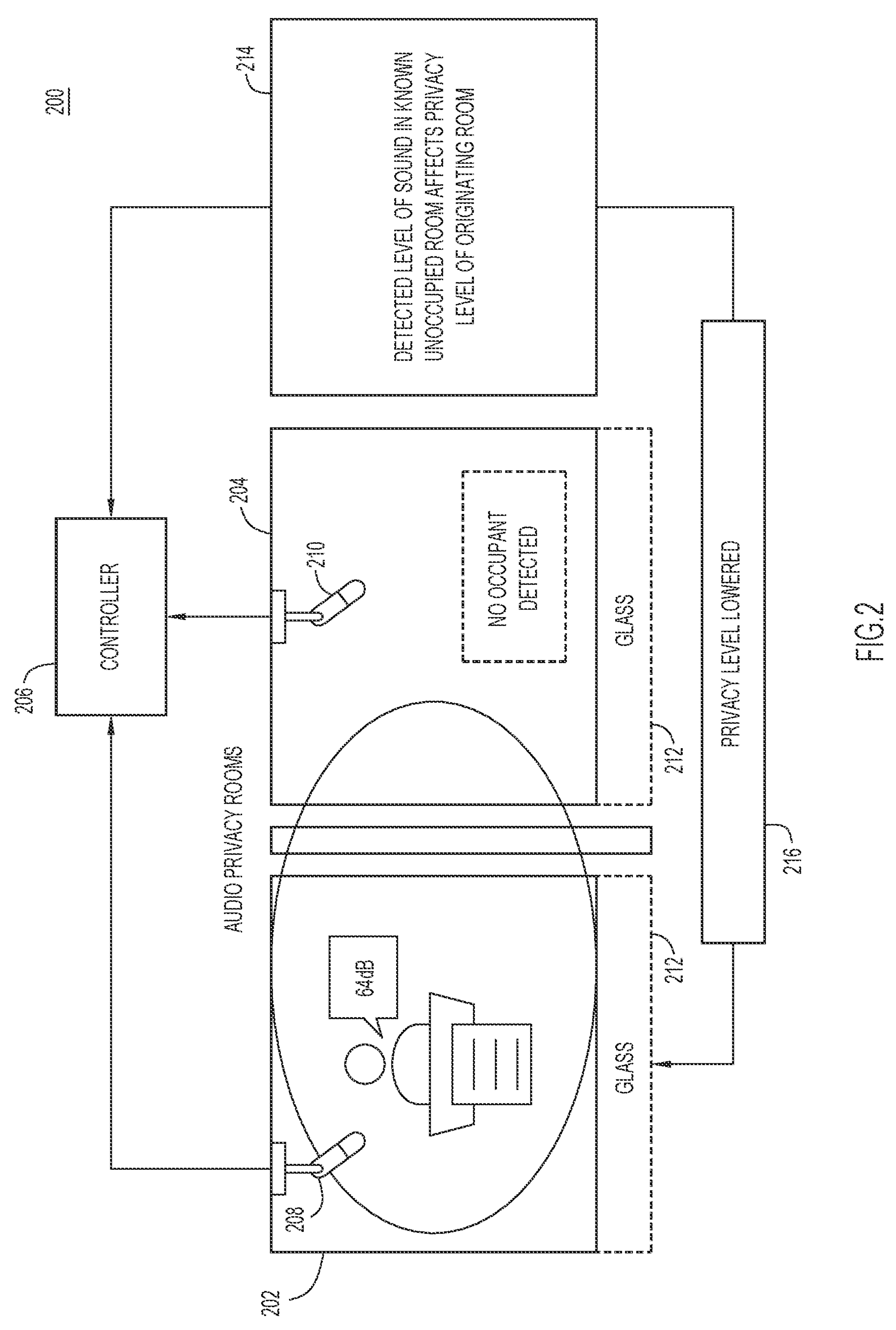
FIG. 2 is a diagram depicting an environment that is analyzed to assess the privacy level of the environment, according to an example embodiment.

With reference now to FIG. 2, a diagram is provided of an environment 200 that is analyzed to assess the privacy level of the environment according to an example embodiment. As depicted, environment 200 includes two audio privacy rooms 202 and 204 and a controller 206 (which can correspond to privacy management server 102, as depicted and described with reference to FIG. 1, or one or more components thereof). In the example embodiment of environment 200, audio privacy room 202 is occupied by an individual participating in a virtual meeting, and audio privacy room 204 is unoccupied. Microphones 208 and 210 are provided in audio privacy rooms 202 and 204, respectively. By analyzing audio collected via microphone 210, it can be determined that the room is unoccupied, however there is audio coming from audio privacy room 202 that is detectable in room 204 due to poor insulation (e.g., because of glass 212 or other building materials). Controller 206 can classify the privacy level of rooms 202 and 204 based on the occupancy of each room and the level of audio that can be detected from each audio privacy room 202 and 204. In the depicted embodiment, controller 206 determines at operation 214 that the sound in audio privacy room 204, which is unoccupied, affects the confidentiality certification (e.g., privacy level) of the originating audio privacy room 202, and at operation 216, the privacy level of audio privacy room 202 is lowered.

Figure 3:
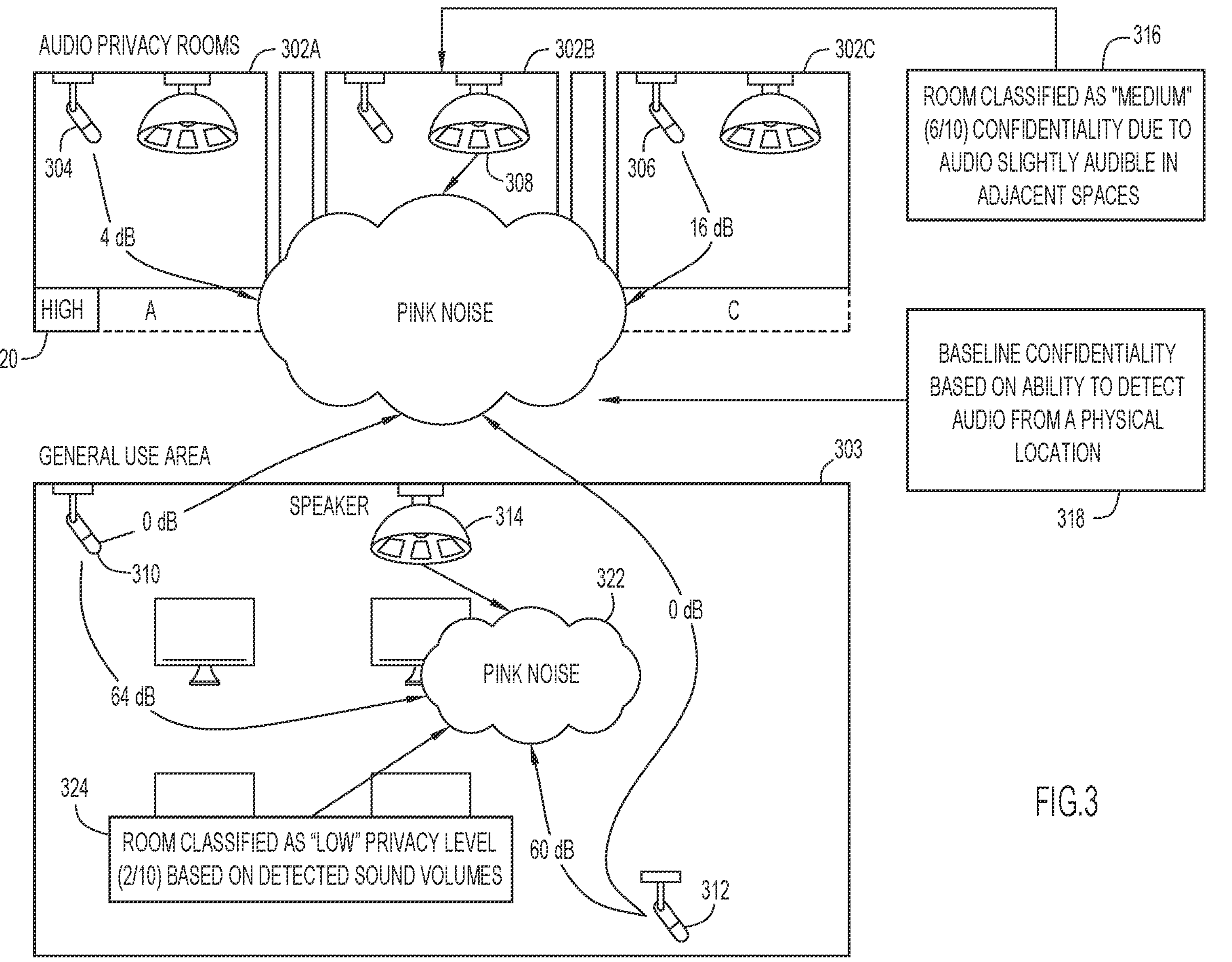
FIG. 3 is a diagram depicting an environment that is analyzed to classify rooms with regard to privacy, according to an example embodiment.

With reference now to FIG. 3, a diagram is provided depicting an environment 300 that is analyzed to classify rooms with regard to privacy, according to an example embodiment, as depicted, environment 300 includes audio privacy rooms 302A-303C, each of which includes a microphone (e.g., microphones 304 and 306) and a speaker (e.g., speaker 308). Environment 300 also includes a general use area 303 that has an open floor plan. General use area 303 also includes microphones 310 and 312, as well as a speaker 314.

Environment 300 may be configured to perform both an initial and repeated classification of privacy levels for physical spaces. The speakers (e.g., speaker 308 and speaker 314) and microphones (e.g., microphones 304, 306, 310, and 312)

may be provided in the form of existing teleconference components. Using the various speakers and microphones, environment 300 can be iteratively tested to determine whether audio can be detected from adjacent physical spaces. In the depicted example, speaker 308 in audio privacy room 302B can emit pink or white noise at a certain volume, and the microphones 304 and 306 in adjacent audio privacy rooms 302A and 302C, respectively, can obtain audio to determine the sound level of the noise emitted by speaker 308 from the vantage point of audio privacy rooms 302A and 302C. In this example, microphone 304 detects a volume of 4 dB, and microphone 306 detects a volume of 16 dB. Thus, at operation 316, room 302B can be certified as having a medium confidentiality due to the audio being slightly audible in the adjacent spaces. A privacy score (e.g., 6/10) can be provided by comparing the dB levels that are detectable by microphones 304 and 306 to a predetermined listing of dB levels and corresponding privacy levels. At operation 318 a baseline confidentiality or privacy level can be established based on the testing using speaker 308 and microphones 304 and 306. In some embodiments, rooms can be provided with digital signage that indicates the privacy level of the rooms; in the depicted embodiment, signage 320 indicates that audio privacy room 302A has a high privacy level so that an occupant can be properly informed. Signage 320 can be dynamically updated for particular users as they approach audio privacy room 302A based on proximity sensors and/or a previous history of a particular user's speaking habits. Thus, approaching a room may indicate to the user whether the room will be useful or not useful as a confidential space based on the user's past behavior.

General use area 303 can likewise be assessed for privacy either independently or in conjunction with audio privacy rooms 302A-302C. As depicted, microphones 310 and 312 cannot detect any sound from speaker 308, indicating that a user of audio privacy rooms 302A-302C cannot be overheard by a user of general use area 303. Speaker 314 can emit audio for testing purposes, such as pink noise 322, which is detected by microphone 310 at a volume of 64 dB and by microphone 312 at a volume of 60 dB. Based on these volumes, the privacy level of general use area 303 can be classified as low (e.g., a score of 2/10) at operation 324 due to the open floor plan not attenuating sound.

A variety of volumes and frequencies can be used to certify the privacy level of a room at various levels. Environment 300 can be initially assessed when empty, and assessed on-demand to evaluate the acoustic profile of the space over time. Reassessments can be performed to discover potential tampering with sound proofing or to ensure that privacy levels are updated in the case of any modifications to equipment or furniture in a physical space.

Figure 4:
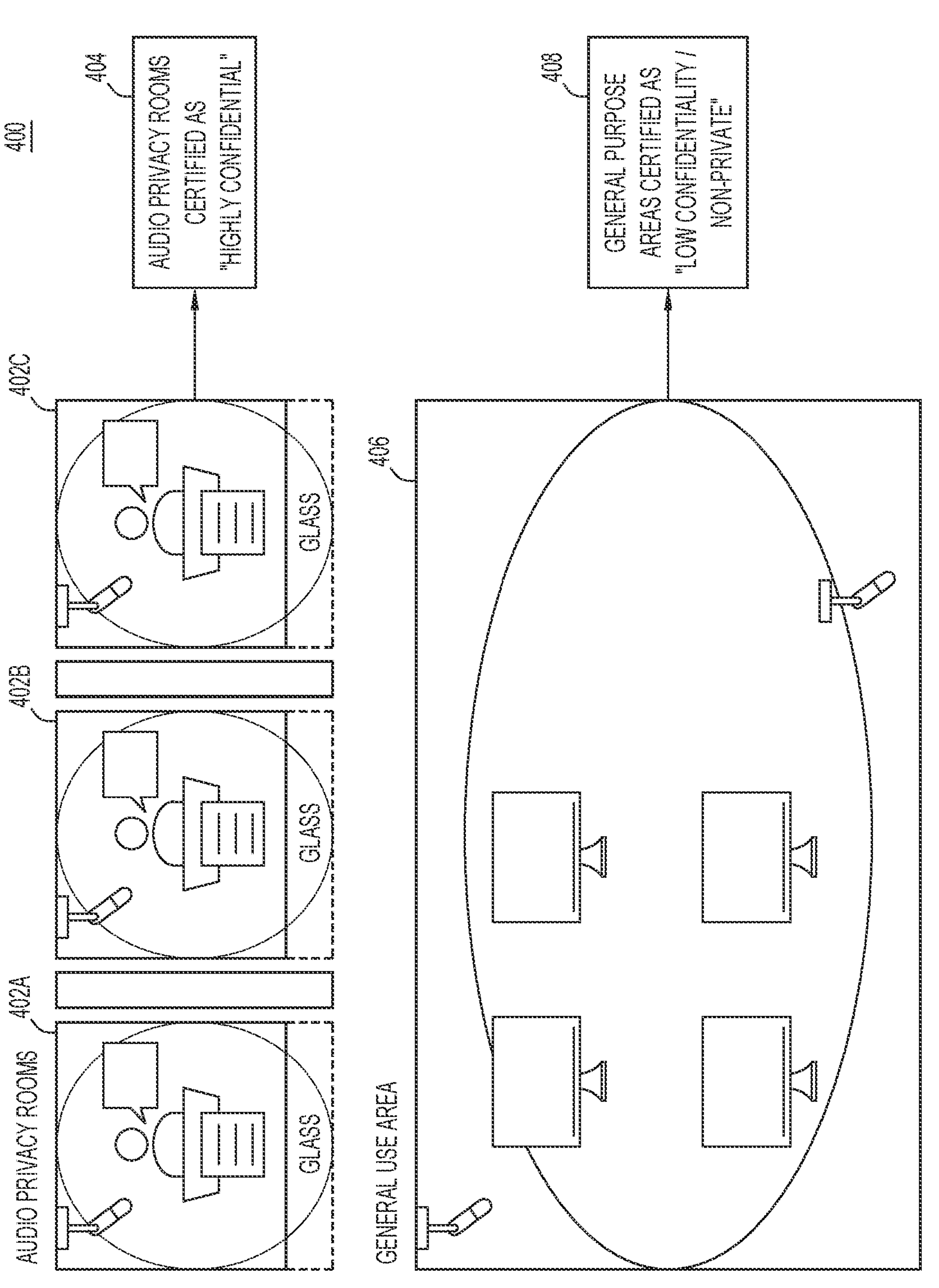
FIG. 4 is a diagram depicting an environment that is classified with regard to privacy, according to an example embodiment.

FIG. 4 is a diagram depicting an environment 400 that is classified with regard to privacy, according to an example embodiment. environment 400 may correspond to environment 300 of FIG. 3 that has been assessed for privacy in accordance with the embodiments presented herein. As depicted, environment 400 includes audio privacy rooms 402A, 402B and 402C and a general use area 406, which may correspond to audio privacy rooms 302A-302C and general use area 303, respectively, as depicted and described with reference to FIG. 3. Based on the audio analysis, audio privacy rooms 402A-402C are certified as "highly confidential" at operation 404. In contrast, general use area 406 is certified as having "low confidentiality" or as being "non-private" at operation 408.

Figure 5:
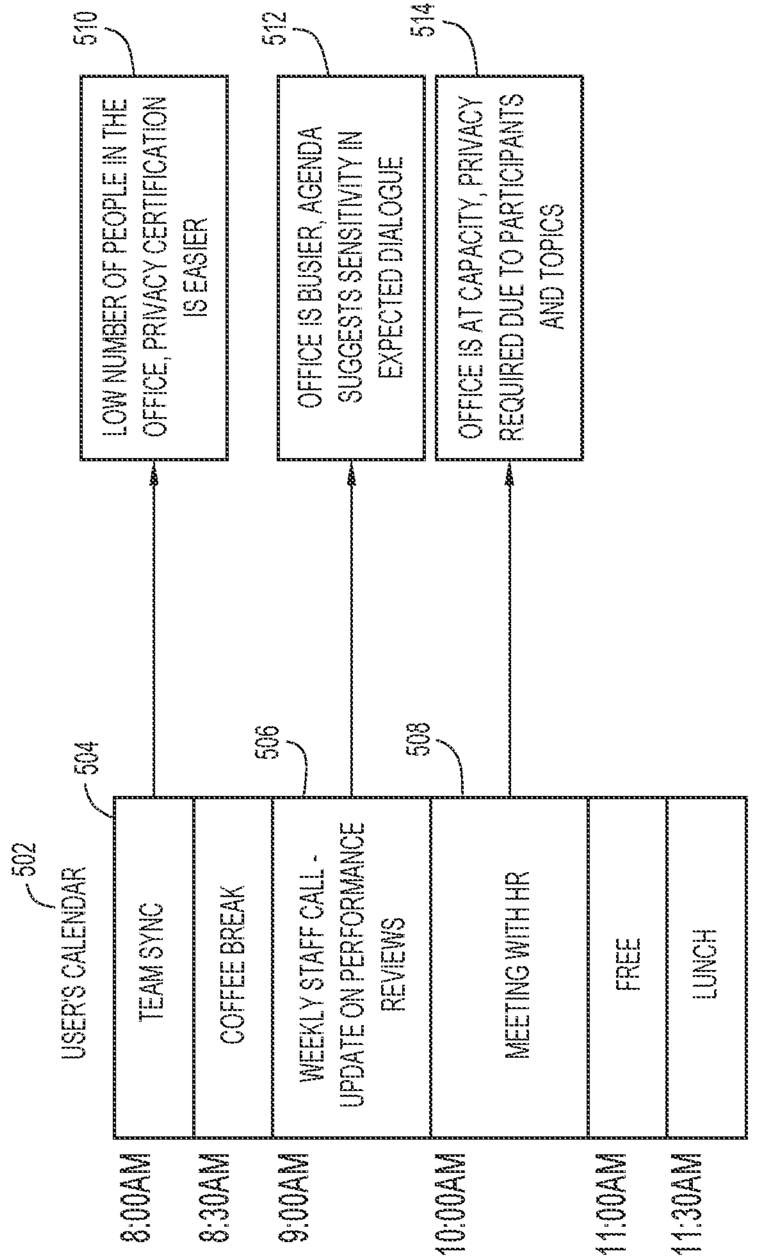
FIG. 5 is a diagram depicting a user's calendar being analyzed, according to an example embodiment.

FIG. 5 is a diagram depicting a user's calendar 500 being analyzed, according to an example embodiment. The calendar data 502 includes events 504, 506, and 508, which can be analyzed to determine the privacy requirements of the user. As an example, the user may be a roaming user that is visiting a satellite office and is requesting a workstation assignment. The calendar data 502 can be obtained by accessing a server that stores user calendar data for an organization. Calendar data 502 indicates that the user has multiple virtual meetings that vary in topics and levels of confidentiality based on the participants, agenda, and content. A generative machine learning model can be applied to predict the confidentiality level of a meeting based on the role of meeting participants, past transcripts between the individual and other participants, and general keywords in the agenda or other documents associated with the meeting, such as emails and email attachments. In some embodiments, privacy requirements can be predicted by manually assigning confidentiality by a participant who has access to the calendar or a participant who scheduled each meeting. At operation 510, the user's first meeting (event 504) can be assigned a low privacy requirement, as proximity sensors reveal that the building or floor remain highly unoccupied at the given time and there is little chance of the conversation to be overheard. As the user's day progresses, the user may receive alerts from a hoteling or hot desk system that is configured to reserve a space for the user automatically based on the dynamics of the office and the confidentiality level of upcoming meetings. At operation 512, a generative model may determine that the agenda for event 506 indicates sensitivity in the expected dialogue, and the privacy requirements for the user at that time can be determined. The privacy requirements may also be updated based on the office becoming busier at that time of day. At operation 514, as the office reaches capacity, the generative model may determine that the description of event 508 indicates that the user will require maximum privacy. Thus, based on calendar data 502, a user's privacy requirements may vary throughout a given day.

Figure 6:
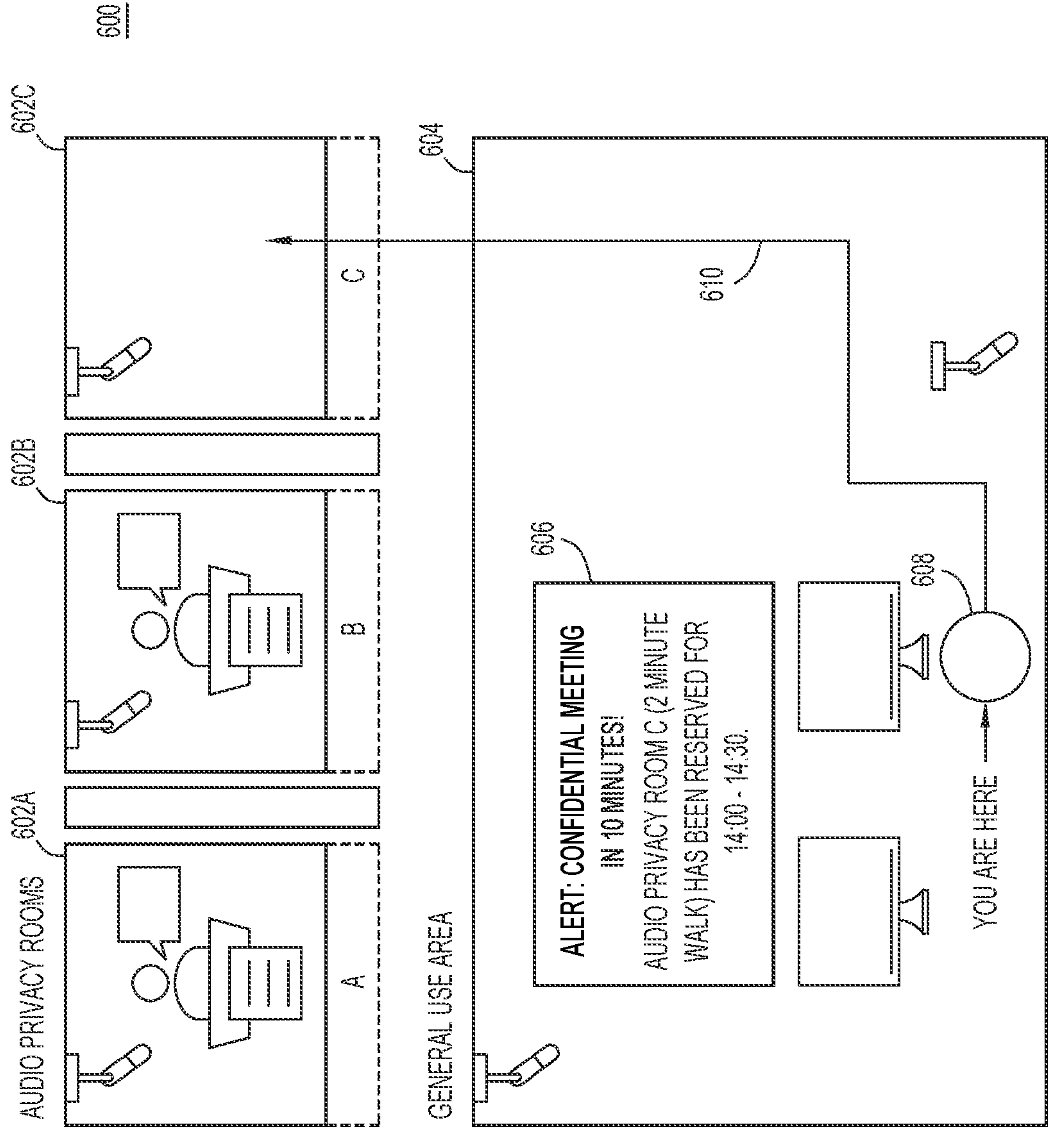
FIG. 6 is a diagram depicting an environment for providing room assignments based on user privacy requirements, according to an example embodiment.

FIG. 6 is a diagram depicting an environment 600 for providing room assignments based on user privacy requirements, according to an example embodiment. Environment 600 may correspond to environments 300 and 400, as depicted and described with reference to FIGS. 3 and 4, respectively. As depicted, environment 600 includes audio privacy rooms 602A-602C and a general use area 604.

When a user is determined to have a confidential meeting, an alert 606 can be sent from a hoteling server to a user's endpoint device to indicate a reservation and warning of an upcoming confidential meeting. As depicted, alert 606 indicates the time of the meeting and informs the user that a particular room, audio privacy room C (audio privacy room 602C). Based on the user's privacy requirements and the privacy levels of audio privacy rooms 602A, 602B and 602C and general use area 604, the user, who may be in general use area 604, is assigned to audio privacy room 602C to grant the user more privacy for the meeting. In some embodiments, a floor plan of environment 600 can be presented to a user to give the user directions to the assigned room; in the depicted embodiment, indicator 608 informs the user as to their current location, and path 610 is shown to instruct the user how to find the assigned room (audio privacy room 602C).

Figure 7:
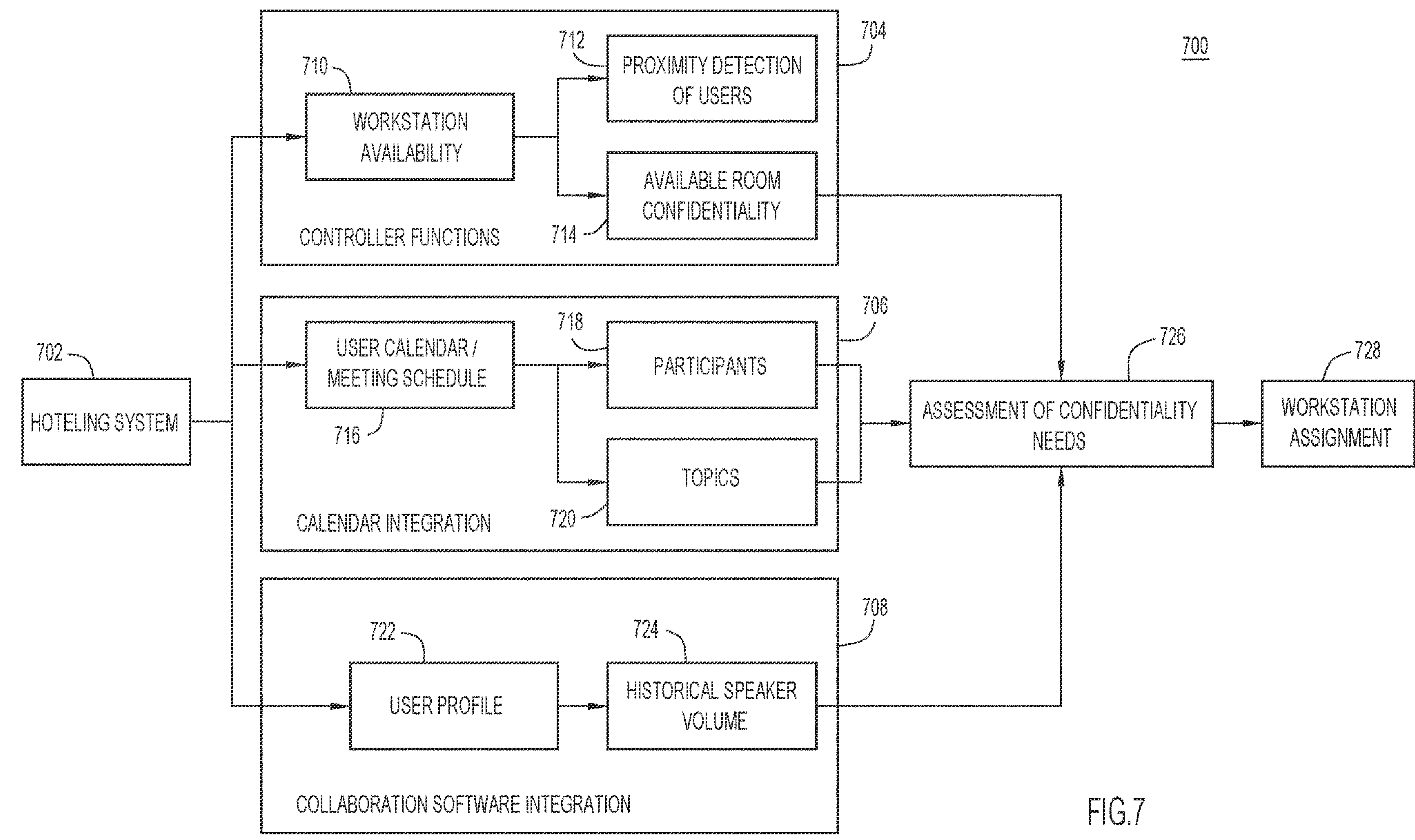
FIG. 7 is a flow diagram depicting a privacy-based workstation assignment model, according to an example embodiment.

FIG. 7 is a flow diagram depicting a privacy-based workstation assignment model 700, according to an example embodiment. Hoteling system 702 may be provided with data that includes sensor data, room occupancy data, user calendar data, user privacy requirements data, and/or room privacy level data in order to perform hoteling operations for a facility.

Broadly, hoteling system 702 can include controller functions 704, calendar integration functions 706, and collaboration software integration functions 708. The controller functions 704 determine the workstation availability 710 based on proximity sensors, user login status, and the like, which can be used to perform proximity detection of users 712. Based on the workstation availability 710 and proximity detection of users 712, the available room confidentiality 714 can be determined, which can include privacy levels for each available room.

The calendar integration functions 706 can access a user calendar 716 or other meeting schedule in order to identify the participants 718 and the topics 720 for meetings. The data can include emails that are associated with a meeting invitation, email attachments, user chat logs regarding meetings, as well as historical data such as transcripts of previous meetings with same or similar participants.

The collaboration software integration function 708 can access user profile data 722, which can include user privacy requirements, user roles in an organization, historical user data, and any other data that can be collected about a user and is indicative of the user's privacy requirements. Additionally, historical speaker volume data 724 can be collected for a user, as different users may have different speech volumes and/or pitches which can affect sound attenuation in an environment.

Based on the data collected by controller functions 704, calendar integration functions 706, and collaboration software integration functions 708, an assessment of a user's confidentiality needs (i.e., privacy requirements) is made at operation 726. The assessment can be made using a rules-based approach in which keywords are identified, and/or one or more machine learning models may be trained and applied to process the data in order to establish the privacy requirements of a user. Given the availability of rooms, privacy level of rooms, and the user's privacy requirements, workstation assignments can be performed at operation 728. Workstation assignment model 700 may perform room assignments in a manner that matches the privacy requirements of users with the privacy levels of available rooms. In some embodiments, users having higher privacy requirements may be preferentially assigned to rooms over users with lower privacy requirements. Workstation assignment model 700 may avoid conflicts in room assignments by assigning users to different rooms throughout a given time span, if needed, to ensure that there are available rooms for users that match their particular privacy requirements.

Figure 8:
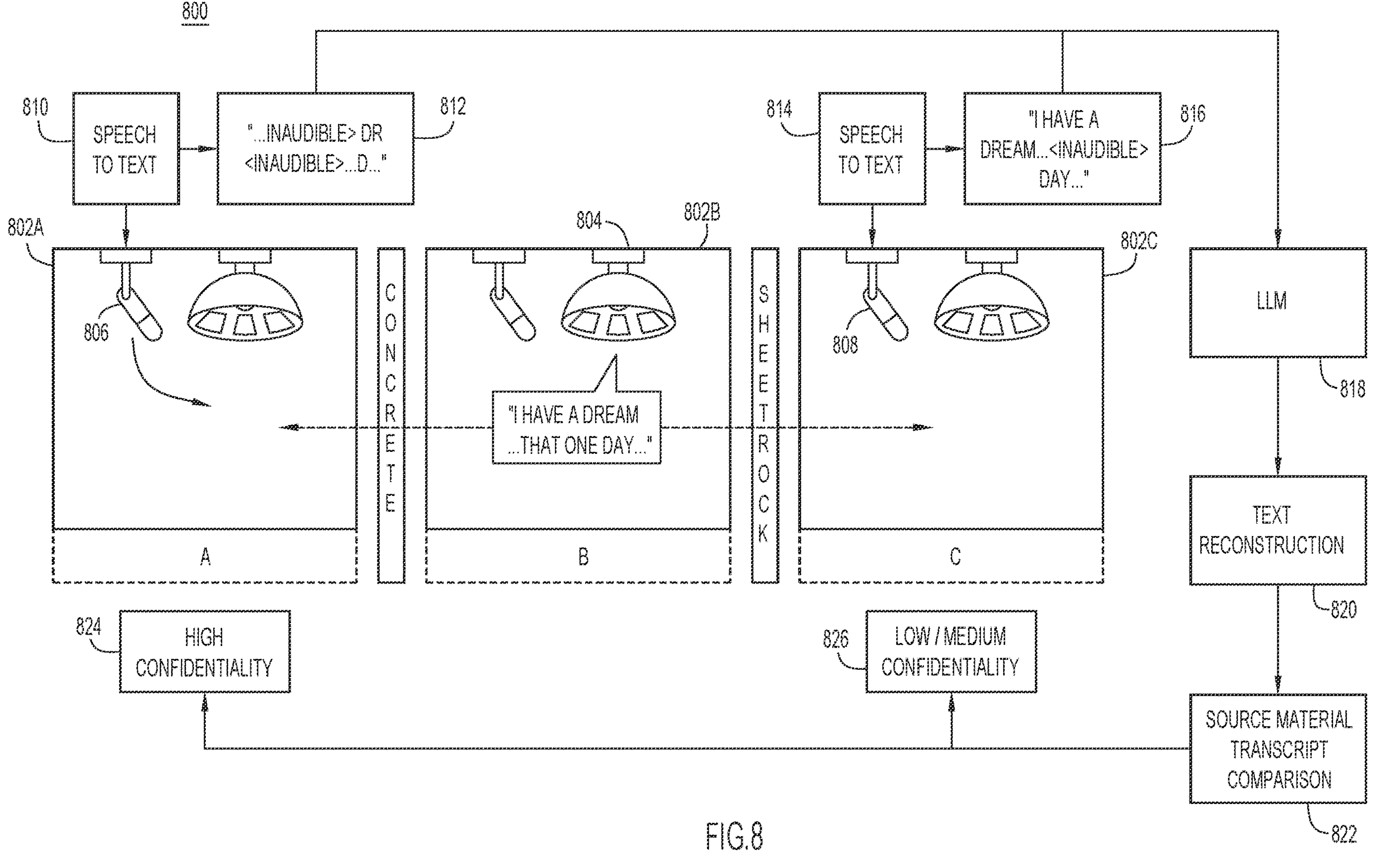
FIG. 8 is a diagram depicting a system for analyzing the intelligibility of overheard speech, according to an example embodiment.

FIG. 8 is a diagram depicting a system 800 for analyzing the intelligibility of overheard speech, according to an example embodiment. As depicted, an environment is analyzed in which there are three rooms 802A-802C. A known sample of speech can be played via a speaker and collected by microphones in adjacent rooms; in the depicted embodiment, speaker 804 plays a prerecorded sample of speech in room 802B, and the audio is collected by microphone 806 in room 802A and by microphone 808 in room 802C. The audio from each microphone can be provided to a speech-to-text model at operations 810 and 814 to generate transcripts 812 and 816, respectively.

In some embodiments, a large language model 818 can be provided transcripts in order to attempt to fill in any gaps in the transcript based on the context of the understood words. Thus, a text reconstruction 820 can be generated for each of the transcripts 812 and 816 that may augment the transcripts with additional words. At operation 822, the source material words are compared to the text reconstruction 820 (or instead, the transcripts 812 and 816) to determine how many words were correctly identified by the speech-to-text model. Room 802B can then be assigned a privacy level based on how many words of each of the transcripts 812 and 816 or the corresponding text reconstruction 820 match the original text of the audio sample. For example, if below a certain threshold number of words match, it can be determined that room 802B has a high confidentiality level (operation 824) with respect to room 802A, and a low or medium confidentiality level (operation 826) with respect to room 802C. Thus, if room 802B is occupied by a user having high privacy requirements, a hoteling system may preferentially assign a user to room 802A over room 802C.

Figure 9:
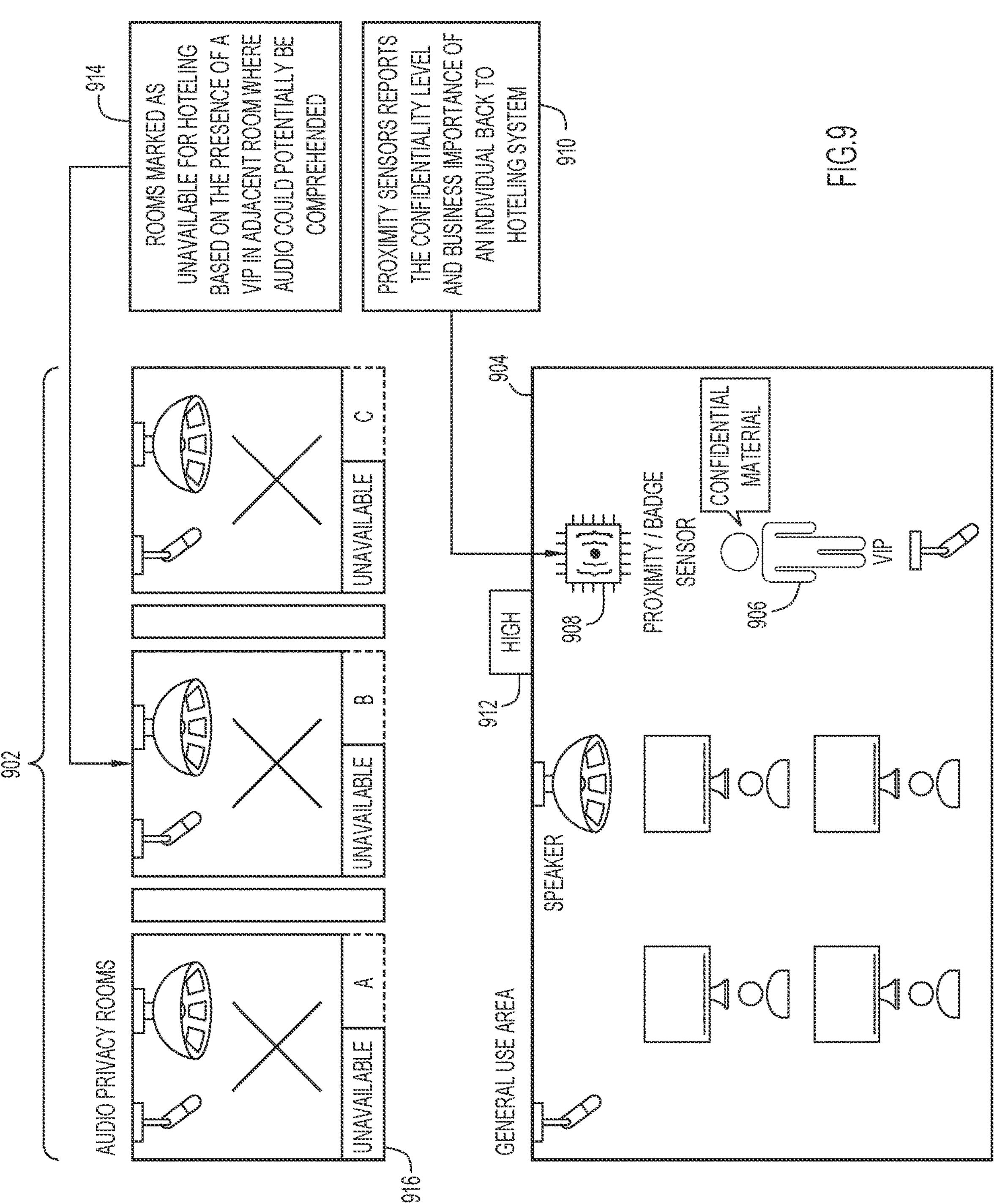
FIGS. 9-11 are diagrams depicting environments for providing privacy based on a user's privacy requirements, according to example embodiments.

FIG. 9 is a diagram depicting an environment 900 for providing privacy based on a user's privacy requirements, according to an example embodiment. As depicted, environment 900 includes three audio privacy rooms 902 and a general use area 904; a "VIP" user 906 is present in general use area 904 and is participating in a confidential discussion. At operation 910, a proximity sensor 908 detects the presence of user 906, who has high privacy requirements. In response, the hoteling system marks the audio privacy rooms 902 as unavailable at operation 914, causing signage 916 to indicate their status. Additionally, signage 912 can indicate that the privacy status of general use area 904 is high.

Figure 10:
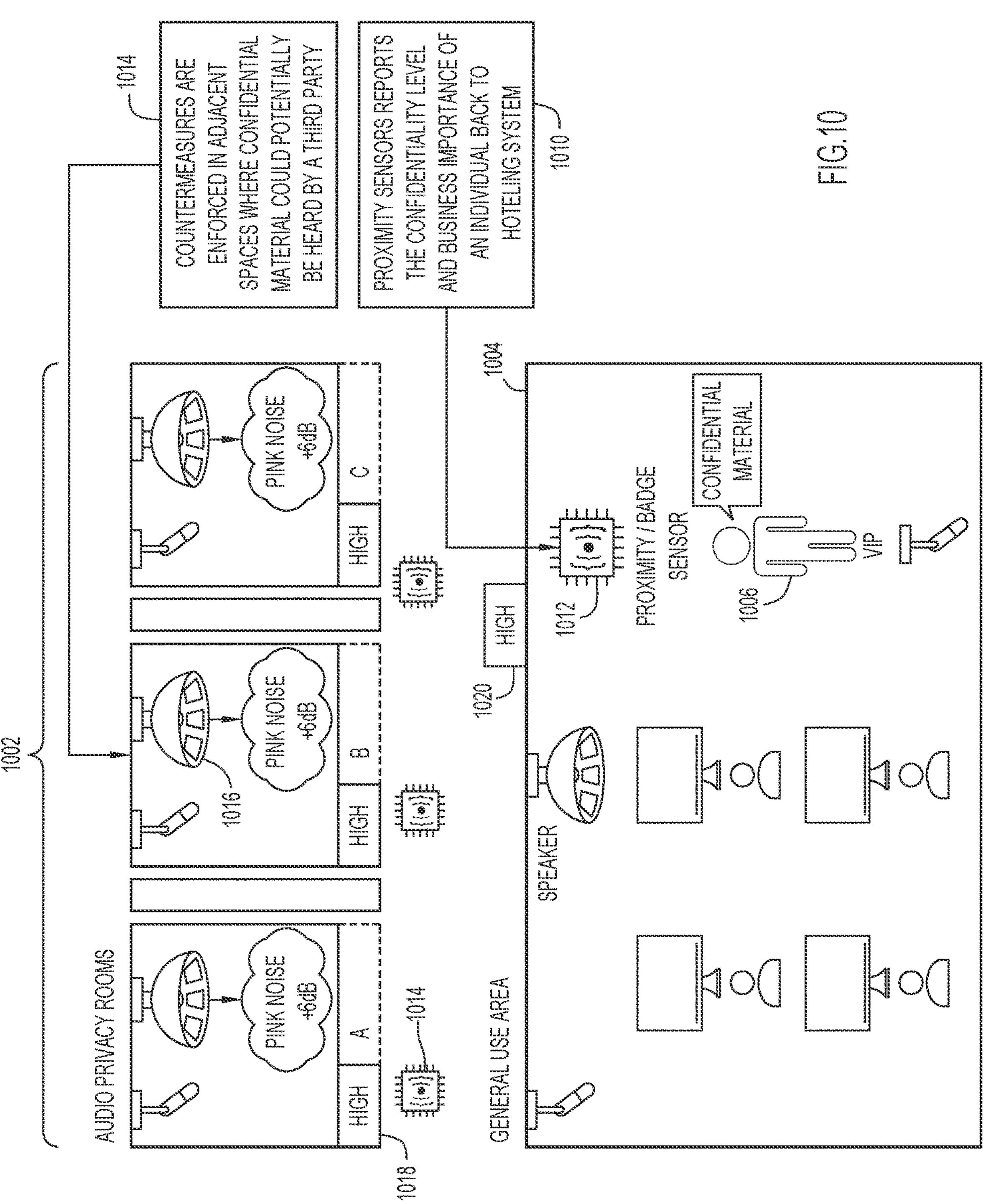

FIG. 10 is a diagram depicting an environment 1000 for providing privacy based on a user's privacy requirements, according to an example embodiment. As depicted, environment 1000 includes three audio privacy rooms 1002 and a general use area 1004; a very important person (VIP) user 1006 is present in general use area 1004 and is participating in a confidential discussion. At operation 1010, a proximity sensor 1012 detects the presence of VIP user 1006, who has high privacy requirements. In response, the hoteling system can deploy countermeasures at audio privacy rooms 1002 to make those rooms available for use at operation 1014, causing signage 1018 to indicate their status. In particular speakers (e.g., speaker 1016) may emit pink noise as a countermeasure. Additionally, signage 1020 can indicate that the privacy status of general use area 1004 is high.

Figure 11:
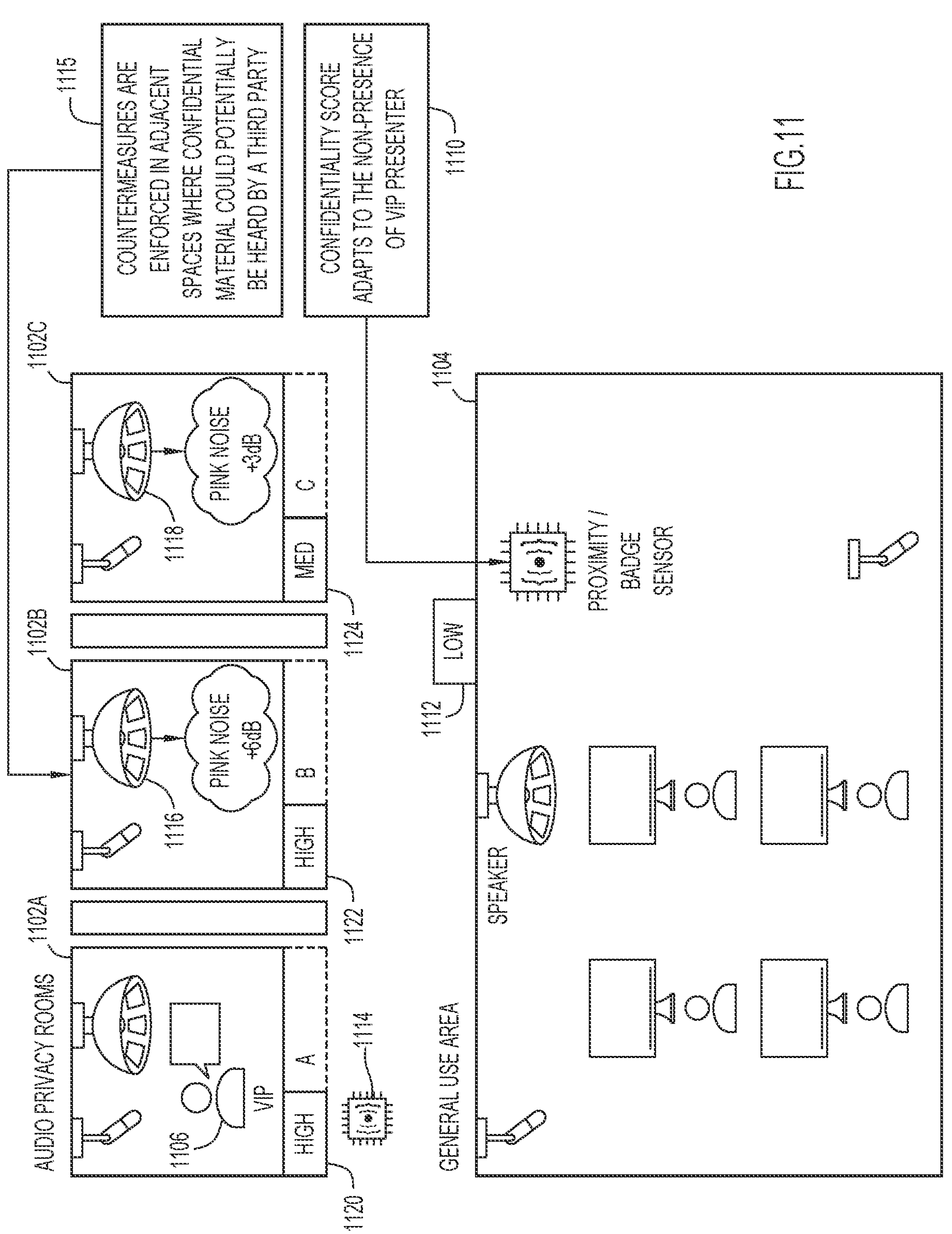

FIG. 11 is a diagram depicting an environment 1100 for providing privacy based on a user's privacy requirements, according to another example embodiment. As depicted, environment 1100 includes three audio privacy rooms 1102A-1102C and a general use area 1104. In contrast to the example embodiments of FIGS. 9 and 10, a VIP user 1106 has moved to audio privacy room 1102A and is participating in a confidential discussion. At operation 1110, the confidentiality or privacy score adapts to the movement of VIP user 1106, and the general use area 1104 is reclassified as having a low privacy level, as indicated by signage 1112. The VIP user 1106 can be detected by a proximity sensor 1114, and countermeasures can be activated (operation 1115) to ensure that audio privacy room 1102A has a high privacy level. In particular, speakers 1116 and 1118 can be activated in audio privacy rooms 1102B and 1102C to emit pink noise. Thus, VIP user 1106 cannot be overheard. Additionally, signage 1120, 1122, and 1124 can be updated to reflect the changes in privacy levels for each of audio privacy rooms 1102A-1102C.

Figure 12:
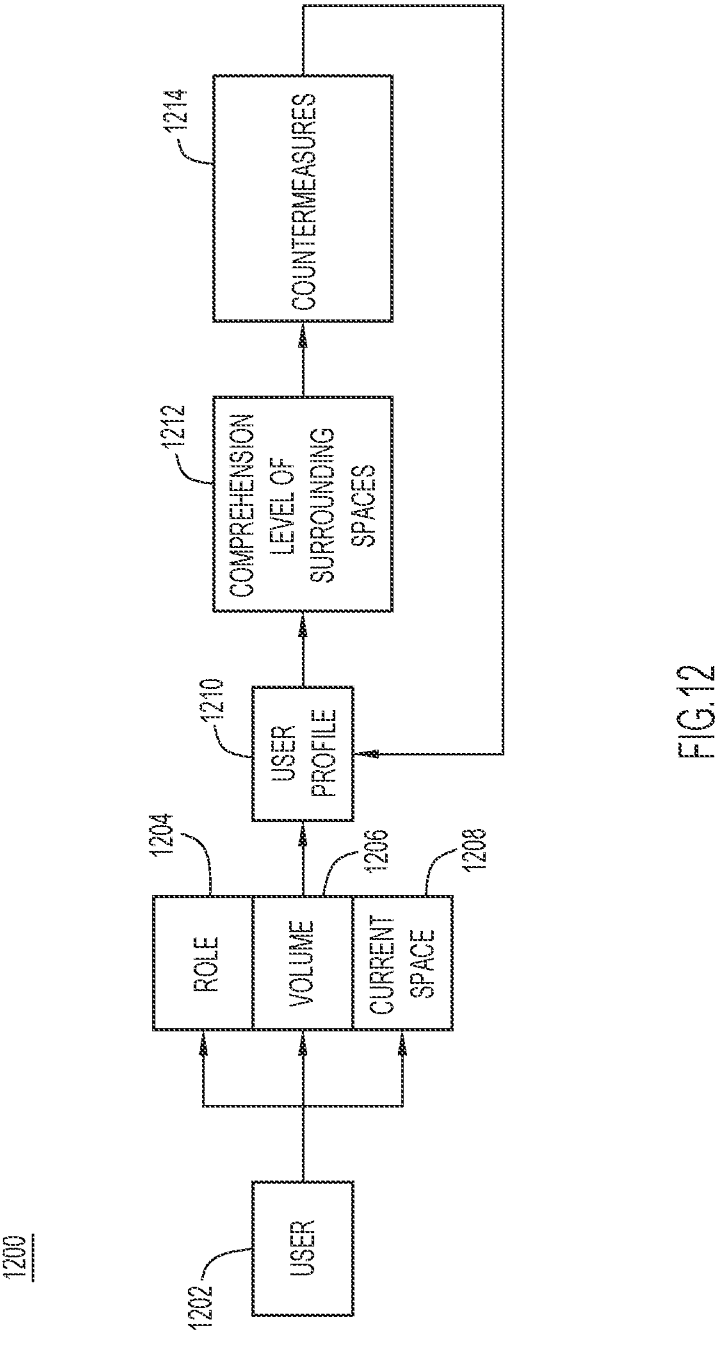
FIG. 12 is a flow diagram depicting a model for assigning a user to a room based on the user's privacy requirements, according to an example embodiment.

FIG. 12 is a flow diagram depicting a model 1200 for assigning a user to a room based on the user's privacy requirements, according to an example embodiment. As depicted, model 1200 begins with analyzing a particular user

1202 who has requested a room assignment. The role 1204 of the user may be analyzed in combination with the volume 1206 of the user's speaking voice and any current space 1208 that is available to which to assign the user. Based on the user's role and speaking volume, privacy requirements can be determined for the user to generate a user profile 1210; any current space 1208 that is available can be evaluated for a privacy level based on known properties of the space that are determined by analyzing captured audio data. Additionally, a comprehension level of the surrounding spaces 1212 can be analyzed based on techniques disclosed herein that employ a speech-to-text model to generate a transcript to evaluate the intelligibility of speech within each available space. If a room is available that satisfies the user's privacy requirements, the user can be assigned to that space; if desired, countermeasures 1214 can be deployed to increase the privacy level of one or more spaces. As a user moves throughout spaces, these operations can be repeated to dynamically update a user's profile, evaluate environments for changes in privacy levels, and activate or deactivate countermeasures in a changing setting.

Figure 13:
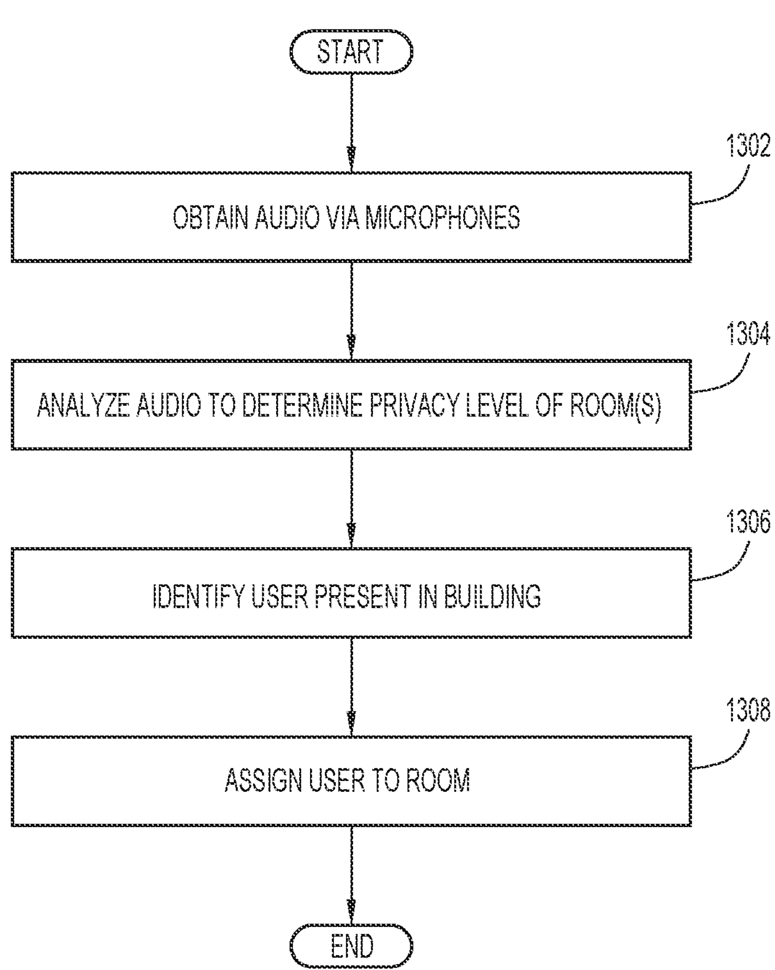
FIG. 13 is a flow chart of a method for assigning a user to a room based on the user's privacy requirements, according to an example embodiment.

FIG. 13 is a flow chart of a method 1300 for assigning a user to a room based on the user's privacy requirements, according to an example embodiment. initially, audio is obtained via one or more microphones at operation 1302. The audio can be provided in the form of a user speaking in a room or in the form of audio that is played back from a speaker. The physical location of the audio source may include any room or other workspace for which an evaluation of a privacy level is desired. The audio may be obtained via one or more microphones that are physically located at any location that presents an eavesdropping concern, such as immediately outside of a conference room being evaluated for its privacy level.

The audio is analyzed to determine the privacy level of one or more rooms at operation 1304. The audio can be analyzed by determining the volume (e.g., in dB) of the audio and comparing the volume to one or more thresholds which can indicate a privacy level of each room being evaluated. In some embodiments, a speech-to-text model is used to convert the audio into a transcript, which is then compared against the known words that were spoken or played back in order to determine whether a user's speech will be intelligible or not by a potential eavesdropper. Thus, one or more rooms can be scored with regard to privacy levels.

A user is identified as being present in a building at operation 1306. The identity of the user can be obtained by the user logging into a computing device, by performing facial recognition, or by a proximity sensor that detects the user's identification badge. When the user requests assignment to a room, a hoteling system can analyze the user's privacy requirements in combination with the privacy levels of the room to identify any rooms that are suitable for assignment. In some embodiments, acoustic countermeasures can be activated in order to increase the privacy level of certain rooms. Once a room is selected, the user is assigned to the room at operation 1308, and can safely conduct a confidential discussion.

Figure 14:
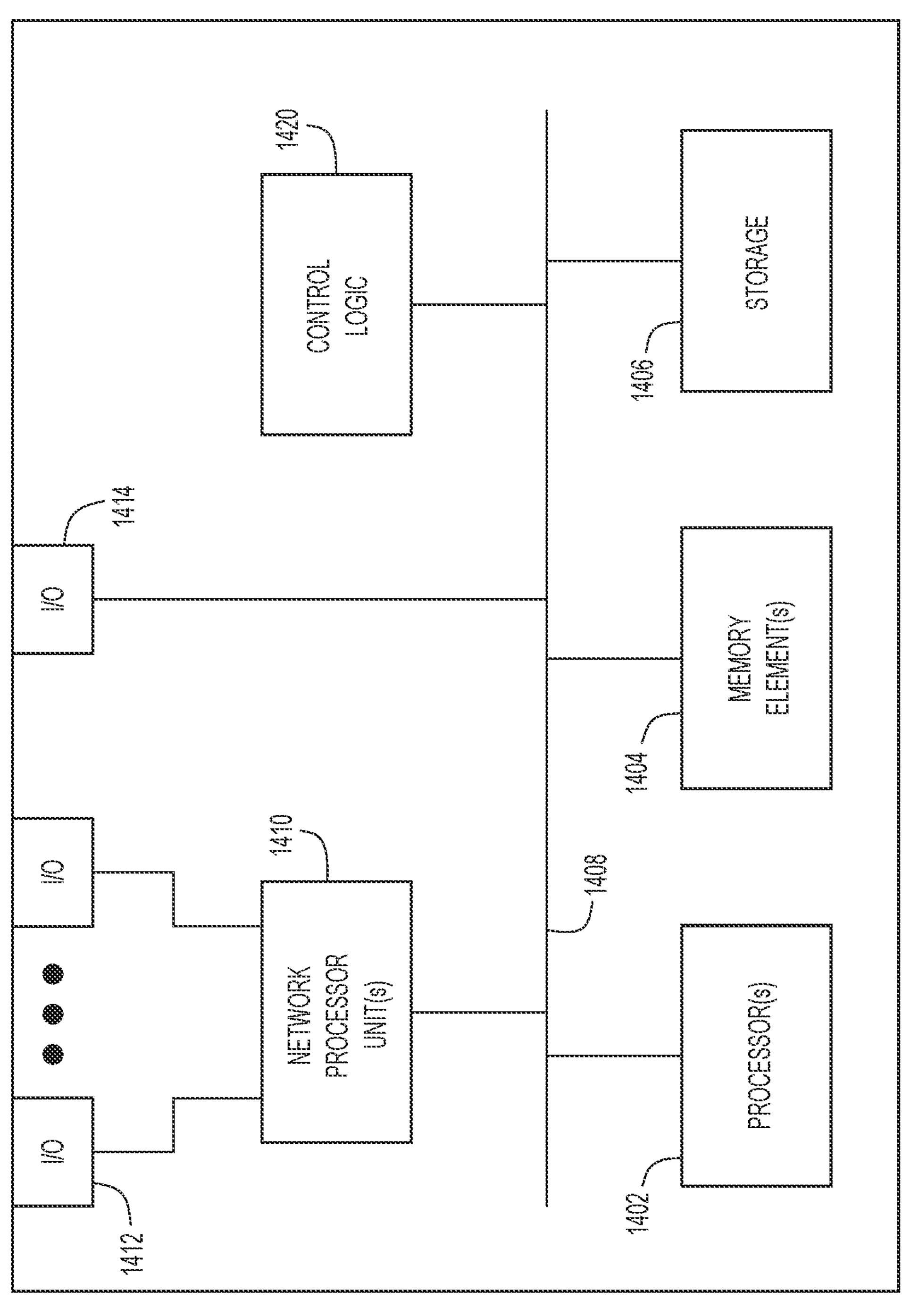
FIG. 14 is a block diagram of a device that may be configured to perform operations relating to assessing workspaces for privacy and allocating users to workspaces, as presented herein.

Referring now to FIG. 14, FIG. 14 illustrates a hardware block diagram of a computing device 1400 that may perform functions associated with operations discussed herein in connection with the techniques depicted in FIGS. 1-13. In at least one embodiment, the computing device 1400 may include one or more processor(s) 1402, one or more memory element(s) 1404, storage 1406, a bus 1408, one or more network processor unit(s) 1410 interconnected with one or more network input/output (I/O) interface(s) 1412, one or more I/O 1414, and control logic 1420. In various embodiments, instructions associated with logic for computing device 1400 can overlap in any manner and are not limited to the specific allocation of instructions and/or operations described herein.

In at least one embodiment, processor(s) 1402 is/are at least one hardware processor configured to execute various tasks, operations and/or functions for computing device 1400 as described herein according to software and/or instructions configured for computing device 1400. Processor(s) 1402 (e.g., a hardware processor) can execute any type of instructions associated with data to achieve the operations detailed herein. In one example, processor(s) 1402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1404 and/or storage 1406 is/are configured to store data, information, software, and/or instructions associated with computing device 1400, and/or logic configured for memory element(s) 1404 and/or storage 1406. For example, any logic described herein (e.g., control logic 1420) can, in various embodiments, be stored for computing device 1400 using any combination of memory element(s) 1404 and/or storage 1406. Note that in some embodiments, storage 1406 can be consolidated with memory element(s) 1404 (or vice versa), or can overlap/exist in any other suitable manner.

In at least one embodiment, bus 1408 can be configured as an interface that enables one or more elements of computing device 1400 to communicate in order to exchange information and/or data. Bus 1408 can be implemented with any architecture designed for passing control, data and/or information between processors, memory elements/storage, peripheral devices, and/or any other hardware and/or software components that may be configured for computing device 1400. In at least one embodiment, bus 1408 may be implemented as a fast kernel-hosted interconnect, potentially using shared memory between processes (e.g., logic), which can enable efficient communication paths between the processes.

In various embodiments, network processor unit(s) 1410 may enable communication between computing device 1400 and other systems, entities, etc., via network I/O interface(s) 1412 (wired and/or wireless) to facilitate operations discussed for various embodiments described herein. In various embodiments, network processor unit(s) 1410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1400 and other systems, entities, etc. to facilitate operations for various embodiments described herein. In various embodiments, network I/O interface(s) 1412 can be configured as one or more Ethernet port(s), Fibre Channel ports, any other I/O port(s), and/or antenna(s)/antenna array(s) now known or hereafter developed. Thus, the network processor unit(s) 1410 and/or network I/O interface(s) 1412 may include suitable interfaces for receiving, transmitting, and/or otherwise communicating data and/or information in a network environment.

I/O 1414 allow for input and output of data and/or information with other entities that may be connected to computing device 1400. For example, I/O 1414 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1420 can include instructions that, when executed, cause processor(s) 1402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1404 and/or storage 1406 can store data, software, code, instructions (e.g., processor instructions), logic, parameters, combinations thereof, and/or the like used for operations described herein. This includes memory element(s) 1404 and/or storage 1406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In some aspects, the techniques described herein relate to a computer-implemented method including: obtaining audio from one or more rooms of a building, wherein the audio is obtained via one or more microphones that are positioned outside of each of the one or more rooms; analyzing the audio to determine a privacy level for each of the one or more rooms; identifying a user who is present in the building, wherein an identity of the user indicates privacy requirements of the user; and assigning the user to a particular room of the one or more rooms based on the privacy requirements of the user and the privacy level of each of the one or more rooms.

In some aspects, the techniques described herein relate to a computer-implemented method, wherein the audio includes a speech sample including a plurality of words, and wherein the privacy level is further determined by: analyzing the audio using a speech-to-text conversion model to generate a transcript; and comparing the transcript to the plurality of words of the speech sample to evaluate the audio for intelligibility, wherein the privacy level of the particular room is further determined based on the intelligibility of the audio.

In some aspects, the techniques described herein relate to a computer-implemented method, wherein the audio is evaluated for intelligibility by calculating a confidentiality score based on a number of the plurality of words that are correctly identified by the speech-to-text conversion model, and wherein the privacy level of the particular room is further based on the confidentiality score.

In some aspects, the techniques described herein relate to a computer-implemented method, further including: transmitting eavesdropping remediation instructions in response to determining that the privacy level of the particular room satisfies a threshold level, wherein the eavesdropping remediation instructions cause one or more of: a visual alert to be activated in proximity to the particular room, and an acoustic countermeasure to be activated at a location in proximity to the particular room.

In some aspects, the techniques described herein relate to a computer-implemented method, wherein the privacy requirements of the user indicate a room assignment priority of the user, and wherein the user is preferentially assigned to the particular room over one or more other users.

In some aspects, the techniques described herein relate to a computer-implemented method, wherein the privacy level of each room is dynamically reassessed over a span of time.

In some aspects, the techniques described herein relate to a computer-implemented method, wherein the privacy level of the particular room is further determined based on an occupancy of one or more adjacent rooms.

In some aspects, the techniques described herein relate to a computer-implemented method, further including: in response to determining that the privacy level of the particular room does not satisfy a threshold level, unassigning one or more other users from at least one room that is adjacent to the particular room.

In some aspects, the techniques described herein relate to a computer-implemented method, wherein the privacy requirements of the user are determined by analyzing one or more of: a meeting agenda, a role of one or more meeting participants, and a transcript of one or more previous meetings.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain audio from one or more rooms of a building, wherein the audio is obtained via one or more microphones that are positioned outside of each of the one or more rooms; analyze the audio to determine a privacy level for each of the one or more rooms; identify a user who is present in the building, wherein an identity of the user indicates privacy requirements of the user; and assign the user to a particular room of the one or more rooms based on the privacy requirements of the user and the privacy level of each of the one or more rooms.

In some aspects, the techniques described herein relate to a system, wherein the audio includes a speech sample including a plurality of words, and wherein the privacy level is further determined by: analyzing the audio using a speech-to-text conversion model to generate a transcript; and comparing the transcript to the plurality of words of the speech sample to evaluate the audio for intelligibility, wherein the privacy level of the particular room is further determined based on the intelligibility of the audio.

In some aspects, the techniques described herein relate to a system, wherein the audio is evaluated for intelligibility by calculating a confidentiality score based on a number of the plurality of words that are correctly identified by the speech-to-text conversion model, and wherein the privacy level of the particular room is further based on the confidentiality score.

In some aspects, the techniques described herein relate to a system, wherein the program instructions further include instructions to: transmit eavesdropping remediation instructions in response to determining that the privacy level of the particular room satisfies a threshold level, wherein the eavesdropping remediation instructions cause one or more of: a visual alert to be activated in proximity to the particular room, and an acoustic countermeasure to be activated at a location in proximity to the particular room.

In some aspects, the techniques described herein relate to a system, wherein the privacy requirements of the user indicate a room assignment priority of the user, and wherein the user is preferentially assigned to the particular room over one or more other users.

In some aspects, the techniques described herein relate to a system, wherein the privacy level of each room is dynamically reassessed over a span of time.

In some aspects, the techniques described herein relate to a system, wherein the privacy level of the particular room is further determined based on an occupancy of one or more adjacent rooms.

In some aspects, the techniques described herein relate to one or more non-transitory computer readable storage media having program instructions embodied therewith, the program instructions executable by a computer to cause the computer to perform operations including: obtaining audio from one or more rooms of a building, wherein the audio is obtained via one or more microphones that are positioned outside of each of the one or more rooms; analyzing the audio to determine a privacy level for each of the one or more rooms; identifying a user who is present in the building, wherein an identity of the user indicates privacy requirements of the user; and assigning the user to a particular room of the one or more rooms based on the privacy requirements of the user and the privacy level of each of the one or more rooms.

In some aspects, the techniques described herein relate to one or more non-transitory computer readable storage media, wherein the audio includes a speech sample including a plurality of words, and wherein the privacy level is further determined by: analyzing the audio using a speech-to-text conversion model to generate a transcript; and comparing the transcript to the plurality of words of the speech sample to evaluate the audio for intelligibility, wherein the privacy level of the particular room is further determined based on the intelligibility of the audio.

In some aspects, the techniques described herein relate to one or more non-transitory computer readable storage media, wherein the audio is evaluated for intelligibility by calculating a confidentiality score based on a number of the plurality of words that are correctly identified by the speech-to-text conversion model, and wherein the privacy level of the particular room is further based on the confidentiality score.

In some aspects, the techniques described herein relate to one or more non-transitory computer readable storage media, wherein the privacy requirements of the user indicate a room assignment priority of the user, and wherein the user is preferentially assigned to the particular room over one or more other users.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining speech audio from one or more rooms of a building, wherein the speech audio is obtained via one or more microphones that are positioned outside of each of the one or more rooms;

analyzing the speech audio to determine a privacy level for each of the one or more rooms by comparing a number of words identified in the speech audio to a threshold;

identifying a user who is present in the building, wherein an identity of the user indicates privacy requirements of the user; and assigning the user to a particular room of the one or more rooms based on the privacy requirements of the user and the privacy level determined for each of the one or more rooms.

2. The computer-implemented method of claim 1, wherein the speech audio includes a speech sample comprising a plurality of words, and wherein the privacy level is further determined by:

analyzing the speech audio using a speech-to-text conversion model to generate a transcript; and comparing the transcript to the plurality of words of the speech sample to evaluate the speech audio for intelligibility, wherein the privacy level of the particular room is further determined based on the intelligibility of the speech audio.

3. The computer-implemented method of claim 2, wherein the speech audio is evaluated for intelligibility by calculating a confidentiality score based on a number of the plurality of words that are correctly identified by the speech-to-text conversion model, and wherein the privacy level of the particular room is further based on the confidentiality score.

4. The computer-implemented method of claim 1, further comprising:

transmitting eavesdropping remediation instructions in response to determining that the privacy level of the particular room satisfies a threshold level, wherein the eavesdropping remediation instructions cause one or more of: a visual alert to be activated in proximity to the particular room, and an acoustic countermeasure to be activated at a location in proximity to the particular room.

5. The computer-implemented method of claim 1, wherein the privacy requirements of the user indicate a room assignment priority of the user, and wherein the user is preferentially assigned to the particular room over one or more other users.

6. The computer-implemented method of claim 1, wherein the privacy level of each room is dynamically reassessed over a span of time.

7. The computer-implemented method of claim 1, wherein the privacy level of the particular room is further determined based on an occupancy of one or more adjacent rooms.

8. The computer-implemented method of claim 1, further comprising:

in response to determining that the privacy level of the particular room does not satisfy a threshold level, unassigning one or more other users from at least one room that is adjacent to the particular room.

9. The computer-implemented method of claim 1, wherein the privacy requirements of the user are determined by analyzing one or more of: a meeting agenda, a role of one or more meeting participants, and a transcript of one or more previous meetings.

10. A system comprising:

one or more computer processors;

one or more computer readable storage media; and program instructions stored on the one or more computer readable storage media for execution by at least one of the one or more computer processors, the program instructions comprising instructions to:

obtain speech audio from one or more rooms of a building, wherein the speech audio is obtained via one or more microphones that are positioned outside of each of the one or more rooms;

analyze the speech audio to determine a privacy level for each of the one or more rooms by comparing a number of words identified in the speech audio to a threshold;

identify a user who is present in the building, wherein an identity of the user indicates privacy requirements of the user; and assign the user to a particular room of the one or more rooms based on the privacy requirements of the user and the privacy level determined for each of the one or more rooms.

11. The system of claim 10, wherein the speech audio includes a speech sample comprising a plurality of words, and wherein the privacy level is further determined by:

analyzing the speech audio using a speech-to-text conversion model to generate a transcript; and comparing the transcript to the plurality of words of the speech sample to evaluate the speech audio for intelligibility, wherein the privacy level of the particular room is further determined based on the intelligibility of the speech audio.

12. The system of claim 11, wherein the speech audio is evaluated for intelligibility by calculating a confidentiality score based on a number of the plurality of words that are correctly identified by the speech-to-text conversion model, and wherein the privacy level of the particular room is further based on the confidentiality score.

13. The system of claim 10, wherein the program instructions further comprise instructions to:

transmit eavesdropping remediation instructions in response to determining that the privacy level of the particular room satisfies a threshold level, wherein the eavesdropping remediation instructions cause one or more of: a visual alert to be activated in proximity to the particular room, and an acoustic countermeasure to be activated at a location in proximity to the particular room.

14. The system of claim 10, wherein the privacy requirements of the user indicate a room assignment priority of the user, and wherein the user is preferentially assigned to the particular room over one or more other users.

15. The system of claim 10, wherein the privacy level of each room is dynamically reassessed over a span of time.

16. The system of claim 10, wherein the privacy level of the particular room is further determined based on an occupancy of one or more adjacent rooms.

17. One or more non-transitory computer readable storage media having program instructions embodied therewith, the program instructions executable by a computer to cause the computer to perform operations including:

obtaining speech audio from one or more rooms of a building, wherein the speech audio is obtained via one or more microphones that are positioned outside of each of the one or more rooms;

analyzing the speech audio to determine a privacy level for each of the one or more rooms by comparing a number of words identified in the speech audio to a threshold;

identifying a user who is present in the building, wherein an identity of the user indicates privacy requirements of the user; and assigning the user to a particular room of the one or more rooms based on the privacy requirements of the user and the privacy level determined for each of the one or more rooms.

18. The one or more non-transitory computer readable storage media of claim 17, wherein the speech audio includes a speech sample comprising a plurality of words, and wherein the privacy level is further determined by:

analyzing the speech audio using a speech-to-text conversion model to generate a transcript; and comparing the transcript to the plurality of words of the speech sample to evaluate the speech audio for intelligibility, wherein the privacy level of the particular room is further determined based on the intelligibility of the speech audio.

19. The one or more non-transitory computer readable storage media of claim 18, wherein the speech audio is evaluated for intelligibility by calculating a confidentiality score based on a number of the plurality of words that are correctly identified by the speech-to-text conversion model, and wherein the privacy level of the particular room is further based on the confidentiality score.

20. The one or more non-transitory computer readable storage media of claim 17, wherein the privacy requirements of the user indicate a room assignment priority of the user, and wherein the user is preferentially assigned to the particular room over one or more other users.

* * * * *